(12) United States Patent
Hammel et al.

(10) Patent No.: US 6,406,574 B1
(45) Date of Patent: Jun. 18, 2002

(54) METHOD FOR ASSEMBLING A REINFORCED VINYL-BACKED CARPET

(75) Inventors: Wallace J. Hammel, Chatanooga, TN (US); Paul D. Evans, Jr., Dalton; Dan E. Mayfield, Chatsworth, both of GA (US)

(73) Assignee: Collins & Aikman Floorcoverings, Inc., Dalton, GA (US)

( * ) Notice: Subject to any disclaimer, the term of this patent is extended or adjusted under 35 U.S.C. 154(b) by 0 days.

(21) Appl. No.: 09/725,971

(22) Filed: Nov. 29, 2000

(51) Int. Cl.[7] ............ B32B 31/06; B32B 31/08; B32B 31/12
(52) U.S. Cl. ............ 156/72; 428/95; 428/97; 427/407.1; 427/407.3; 427/428; 118/117; 118/119
(58) Field of Search ............ 156/72; 428/95, 428/96, 97; 427/402, 407.1, 407.3, 428; 118/117–119, 126

(56) References Cited

U.S. PATENT DOCUMENTS

| | | |
|---|---|---|
| 3,014,829 A | 12/1961 | Curtin |
| 3,704,197 A | 11/1972 | Bahlo |
| 3,922,464 A | 11/1975 | Silver et al. |
| 4,016,318 A * | 4/1977 | DiGioia et al. ............ 428/95 |
| 4,284,681 A | 8/1981 | Tidmarsh et al. |
| 4,595,436 A | 6/1986 | Walker et al. |
| 4,617,210 A | 10/1986 | Zybko |
| 4,702,950 A | 10/1987 | Slosberg et al. |
| 4,849,267 A | 7/1989 | Ward et al. |
| 4,988,551 A * | 1/1991 | Zegler ............ 428/40 |
| 5,010,050 A * | 4/1991 | Wullenweber et al. ...... 502/301 |
| 5,170,743 A | 12/1992 | Zimmer |
| 5,510,141 A * | 4/1996 | Makita et al. ............ 427/165 |
| 5,647,948 A | 7/1997 | Paridis |
| 5,763,039 A * | 6/1998 | Staubs ............ 428/95 |
| 5,849,389 A | 12/1998 | Lunsford |
| 5,948,500 A | 9/1999 | Higgins |
| 6,143,118 A | 11/2000 | Hornaman et al. |
| 6,162,309 A | 12/2000 | Brodeur, Jr. et al. |

FOREIGN PATENT DOCUMENTS

JP 357204267 A * 12/1982
JP 408243457 A * 9/1996

* cited by examiner

Primary Examiner—Sam Chuan Yao
(74) Attorney, Agent, or Firm—Hunton & Williams

(57) ABSTRACT

A method for manufacturing a vinyl-backed carpet is described wherein the carpet is assembled in a single continuous finishing line. The method includes the application of a vinyl plastisol reinforcing layer directly to the back of unfinished woven or tufted carpet material. The method allows the use of a thinner vinyl layer that results in savings in material, processing steps, and energy required for curing.

23 Claims, 3 Drawing Sheets

METHOD FOR ASSEMBLING A REINFORCED VINYL-BACKED CARPET

BACKGROUND OF THE INVENTION

The present invention relates broadly to the manufacture of vinyl-backed floor coverings and more particularly to a process of assembling a floor covering having a vinyl layer intermediate a woven or tufted carpet layer and a backing layer.

Carpet is manufactured through a series of separate processes that are typically carried out on separate manufacturing lines. A first line is used to produce a carpet material that is formed either by weaving textile yarns to form a woven layer or by attaching tufts of textile material to a woven primary backing. In either case, a thin polymeric locking layer is coated to the backside. The output of this process is an unbacked or unfinished carpet material, which is then wound into a roll and transferred to a second processing line. In the second processing line, a layer of vinyl material is added to the back of the carpet to fill the voids in and between the fibers and to provide a uniform surface for attachment of a backing layer. This vinyl layer is typically formed by applying an uncured layer of vinyl on a belt, pressing the unbacked carpet material onto the vinyl sheet and passing the assembly through an oven to cure the vinyl layer in place. Once the vinyl layer has been cured, the carpet/vinyl is separated from the belt and again wound into a roll for transfer to a third processing line where a backing layer is adhered to the vinyl layer.

This typical manufacturing process is highly inefficient in that it requires a separate process line for the vinyl casting process. In addition, the method used to apply the vinyl layer requires the use of a relatively thick layer of vinyl. The cost of virgin vinyl is such that a reduction in the thickness of this layer would result in a significant overall cost reduction for the final product.

It is therefore highly desirable to incorporate a vinyl casting process that would reduce the amount of virgin vinyl required to manufacture the carpet product and that would eliminate the need for a separate vinyl casting processing line.

SUMMARY OF THE INVENTION

Accordingly, it is an objective of the present invention to provide a method of assembling a vinyl-backed floor covering wherein the finishing sub-processes are joined in a single continuous production line.

It is another objective of the present invention to provide a method of finishing a vinyl-backed carpet product with a reduced virgin vinyl material content.

It is yet another objective of the present invention to provide an improved method of applying a reinforced layer of vinyl plastisol or other polymeric material to a textile sheet.

Toward these ends, a method of assembling a floor covering according to the present invention comprises providing a carpet layer having textile fibers defining an upper surface and having an opposing carpet layer back surface. The method further comprises forming a vinyl layer on the carpet layer back surface and adhering a backing layer to the vinyl layer, the backing layer having a front backing surface for adhering to the vinyl layer and an opposing rear backing surface. According to this method, the carpet layer is provided as a continuous sheet and the steps of forming a vinyl layer and adhering a backing layer are performed on the carpet layer in a continuous manner in a single carpet finishing line.

A method of assembling a floor covering according to the present invention may further comprise the step of applying an adhesive to the rear backing surface, wherein this step is performed in a continuous manner in the single carpet finishing line. The adhesive is preferably an oleophobic pressure sensitive adhesive. Where an adhesive is applied, it is preferred that the method further include the step of applying a release cover over the adhesive to prevent inadvertent adhesion of the adhesive prior to installation of the floor covering.

A method of assembling a floor covering according to the present invention may comprise the step of applying a barrier layer to the rear backing surface, the barrier layer having an upper barrier surface adjacent the rear backing surface and a lower barrier surface. The barrier layer is effective for substantially inhibiting migration of moisture from a substrate into the backing layer and for substantially inhibiting migration of backing constituents from the backing to the substrate. The method may further comprise applying an adhesive to the rear barrier surface. The barrier surface in this variation would be effective for substantially inhibiting migration of backing constituents from the backing to the adhesive.

The carpet layer in a method of assembling a floor covering according to the present invention may include a resin composition layer having a front resin surface adhered to at least a portion of the textile fibers and an opposing back resin surface. The carpet layer may include a primary backing to which the textile fibers are attached, the resin composition layer being formed so as to lock the textile fibers to the primary backing. Alternatively, the textile fibers of the carpet layer may be configured as interwoven warp and weft yarns which form a woven carpet fabric having a traffic surface and an opposing rear fabric surface. The warp and weft yarns of the woven carpet fabric define interstices therebetween. The resin composition layer is preferably formed on the rear fabric surface so that a portion of the resin composition layer occupies at least a portion of the interstices.

In a preferred method of assembling a floor covering according to the present invention, the step of forming a vinyl layer includes continuously moving the carpet layer through a vinyl application station. This method further includes depositing a first portion of uncured vinyl material on the carpet layer back surface and spreading the first portion of uncured vinyl material across the carpet layer back surface. The method also includes the step of establishing a substantially uniform predetermined thickness of the vinyl layer. The step of establishing a substantially uniform predetermined thickness preferably includes passing the carpet layer through means for removing excess vinyl material and controlling the thickness of the vinyl layer. The step of establishing a substantially uniform predetermined thickness may include passing the carpet layer between a thickness control roller and a base surface in a predetermined direction. The thickness control roller is configured for engaging and spreading the vinyl material across the carpet layer back surface to provide a substantially uniform vinyl layer. The control roller layer has an outer surface, a portion of which is in contact with the vinyl material and preferably is rotated at a predetermined rate in a direction such that the portion of the control roller surface in contact with the vinyl material moves in a direction opposite to the predetermined direction of motion of the carpet layer.

The step of forming a vinyl layer in a method of assembling a floor covering according to the present invention may include applying a scrim sheet over the first portion of uncured vinyl material spread on the carpet layer back surface and depositing a second portion of uncured vinyl material over the scrim sheet.

The step of forming a vinyl layer in a method of assembling a floor covering according to the present invention preferably further includes heating the uncured vinyl material to a temperature above the cure temperature of the vinyl material to cure the vinyl layer and permanently adhere the vinyl layer to the carpet layer back surface.

The vinyl layer formed in the methods according to the present invention is preferably formed from a polyvinyl chloride plastisol material.

An illustrative method of assembling a floor covering according to the present invention comprises providing a carpet layer having textile fibers defining an upper surface and having an opposing carpet layer back surface. This illustrative method further comprises depositing a first portion of uncured vinyl material on the carpet layer back surface and spreading the first portion of uncured vinyl material across the carpet layer back surface. The method still further comprises applying a scrim sheet over the first portion of uncured vinyl material and depositing a second portion of uncured vinyl material over the scrim sheet. The carpet layer is then passed between a thickness control roller and a base surface in a predetermined direction. The control roller has an outer surface, a portion of which engages the second portion of uncured vinyl material. The control roller is rotated at a predetermined rate in a direction such that the portion of the control roller surface engaging the vinyl material moves in a direction opposite to the predetermined direction of motion of the carpet layer, thereby establishing a vinyl and scrim laminate having a substantially uniform thickness. The illustrative method also comprises heating the uncured vinyl material to a temperature above the cure temperature of the vinyl material to cure the vinyl and permanently adhere the vinyl and scrim laminate to the carpet layer back surface. A backing layer is adhered to the vinyl layer, the backing layer having a front backing surface for adhering to the vinyl layer and an opposing rear backing surface. The carpet layer is preferably provided as a continuous sheet and the steps of depositing a first portion of uncured vinyl material, spreading the first portion of uncured vinyl, applying a scrim sheet, depositing a second portion of uncured vinyl material, passing the carpet layer between a thickness control roller and a base surface, heating the uncured vinyl material; and adhering a backing layer are preferably performed on the carpet layer in a continuous manner in a single carpet finishing line.

A method of applying a polymeric material to a textile sheet having opposed first and second surfaces according to the present invention comprises the steps of forming a plastisol from the polymeric material, depositing a first portion of plastisol on the first surface of the textile sheet and spreading the first portion of plastisol across the first surface of the textile sheet. The textile sheet is passed between a thickness control roller and a base surface in a predetermined direction. The control roller has an outer surface, a portion of which engages the plastisol. The control roller is rotated at a predetermined rate in a direction such that the portion of the control roller surface engaging the plastisol moves in a direction opposite to the predetermined direction of motion of the textile sheet, thereby establishing a layer of polymeric material having a substantially uniform thickness. The method preferably further comprises the step of heating the plastisol to a temperature above the cure temperature of the polymeric material to cure the polymeric material and permanently adhere the polymeric material to the textile sheet.

A method of forming a laminate having a textile sheet with opposing first and second surfaces, a first polymeric composition layer adhered thereto, a reinforcement sheet and a second polymeric composition layer according to the present invention comprises the steps of forming a plastisol including at least one polymeric resin material and depositing a first portion of plastisol on the first surface of the textile sheet. The method further comprises applying a reinforcement sheet over the first portion of plastisol and depositing a second portion of plastisol over the reinforcement sheet. The textile sheet is passed between a thickness control roller and a base surface in a predetermined direction. The control roller has an outer surface, a portion of which engages the second portion of plastisol. The control roller is rotated at a predetermined rate in a direction such that the portion of the control roller surface engaging the plastisol moves in a direction opposite to the predetermined direction of motion of the textile sheet, thereby establishing a substantially uniform overall thickness of the laminate. The method preferably further comprises the step of heating the plastisol to a temperature above the cure temperature of the polymeric material to cure the polymeric material and permanently adhere the polymeric material to the textile sheet. The reinforcement sheet in a laminate formed by this method may be a fiberglass scrim material.

DETAILED DESCRIPTION

Figure 1:
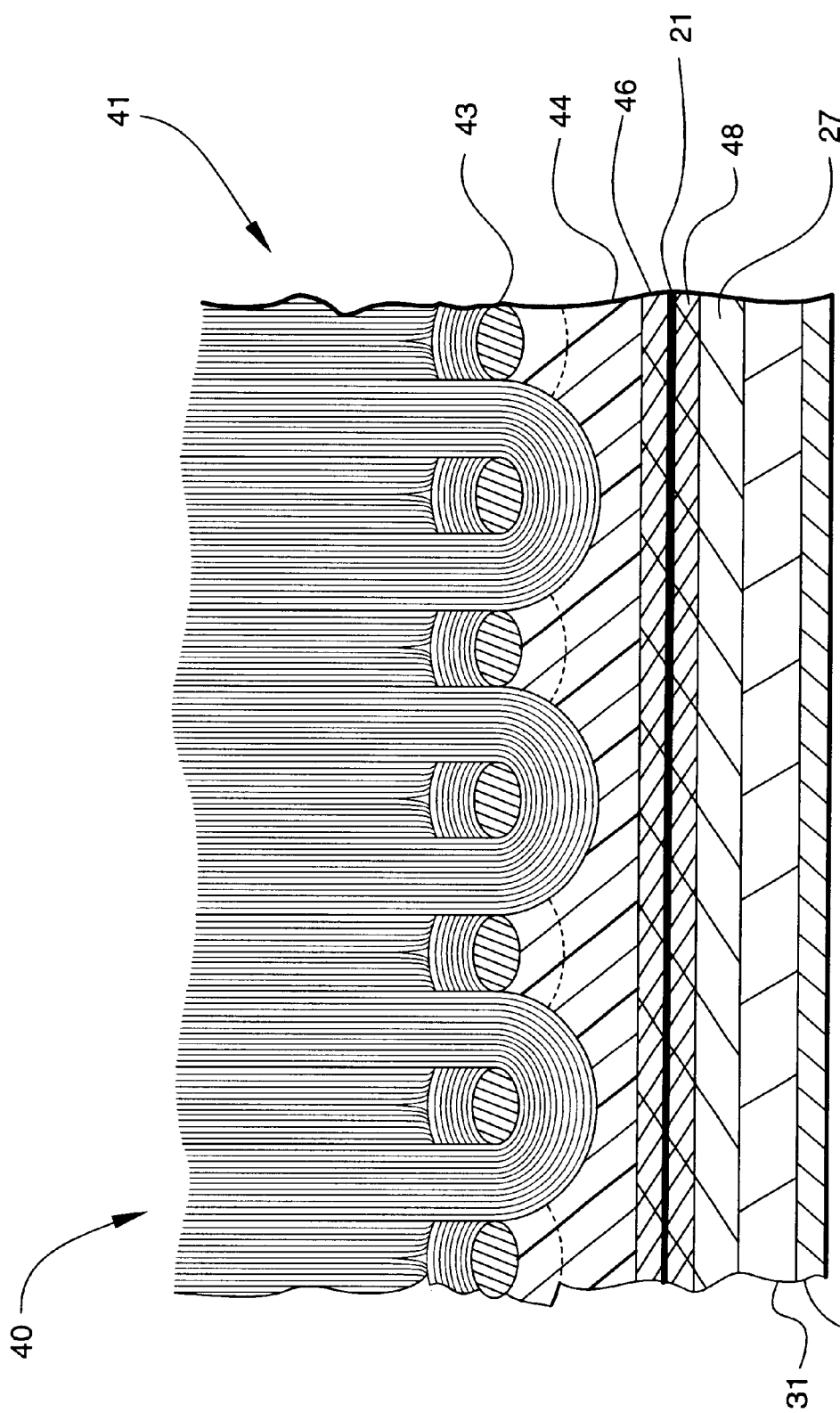
FIG. 1 is a cross-sectional illustration of a carpet product that may be assembled using the method of the present invention.

The present invention is directed to a method for producing a finished vinyl-backed carpet. This method uses a single, continuous process line for forming a vinyl layer on and adhering a backing layer to a pre-coated, unbacked carpet material. FIG. 1 illustrates a typical tufted carpet product 40 as produced by this method. The carpet product 40 has a series of fiber tufts 41 attached to a woven primary backing 43. An optional pre-coat layer 44 serves to lock the fiber tufts 41 to the primary backing 43. A pair of vinyl layers 46, 48 surrounding a scrim material 21 is formed on the back of the pre-coat layer 44. The vinyl layer or layers is typically formed from a polyvinyl chloride (PVC) plastisol material. In an alternative embodiment, the scrim 21 is not used, in which case the second vinyl layer 48 is applied directly to the first vinyl layer 46, essentially forming a single vinyl layer. A secondary backing 27 is adhered to the back of the second vinyl layer 48. An optional adhesive layer 31 with a releasable cover sheet 37 may be adhered to the bottom of the backing layer.

The method of the present invention may be used with either tufted or woven carpet materials. A woven carpet product assembled using a method according to the present invention would have a series of warp and weft yarns forming a woven carpet fabric. A pre-coat layer preferably occupies at least a portion of the interstices formed by the warp and weft yarns. Below the pre-coat layer, the layup for the woven carpet is essentially the same as for the tufted carpet.

The scrim 21 reinforces the vinyl layers 46, 48 and provides dimensional stability to the finished carpet product.

The scrim 21 is typically a fiberglass sheet material but may be formed from other materials as well. The benefits of the scrim 21 are obtained by encapsulating the scrim 21 within the vinyl layers 46, 48 of the carpet. The overall thickness of the combined vinyl layers 46, 48 need be no greater than that which is required to encapsulate the scrim 21 and to provide a substantially smooth, even surface for adhering the backing layer 27.

The method of the present invention incorporates a vinyl layer application process that involves applying a predetermined amount of vinyl material directly to the back of the pre-coated carpet starting material. This application process allows the formation of a uniform vinyl layer that is thinner than layers obtainable through the use of present processes. This allows the production of a finished carpet that has a lower virgin vinyl material content than previous products. In addition, the new process eliminates the need for a separate curing process for the vinyl layer, which in turn facilitates the integration of two formerly separate process lines.

While the following description will discuss the invention as it relates to unfinished carpet, one skilled in the art will understand that the vinyl application process described is applicable to other sheet materials on which a thin, controllable vinyl layer is desired. The application process may also be used to apply other materials other than PVC to carpets or other sheet materials.

Figure 2:
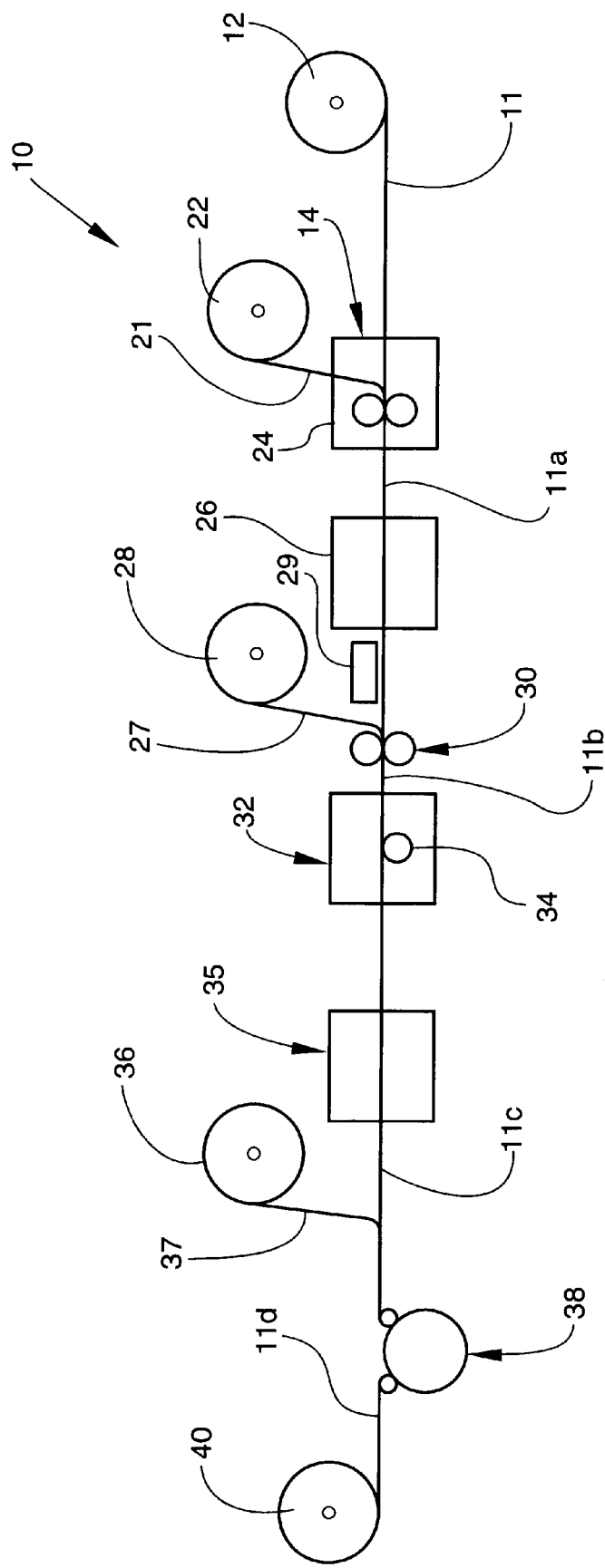
FIG. 2 is a schematic illustration of a process according to the present invention.

With reference now to FIG. 2, there is shown a schematic diagram of a processing line 10 used to perform a process in accordance with the present invention. Unfinished carpet material 11 is taken from a roll 12 and passed through a vinyl application station 14 where vinyl and, if desired, a sheet of scrim material 21 are applied to form a carpet/vinyl laminate 11a. The carpet/vinyl laminate 11a is passed through an oven 26 to cure the vinyl layer in place. A radiant heater 29 is then used to heat the vinyl layer so that a backing material 27 can be adhered thereto using the rollers 30. An adhesive may be added to the backed carpet 11b using adhesive applicator 32. The adhesive is then dried in a dryer 35 to form an adhesive backed carpet 11c. A releasable plastic cover sheet 37 is applied. After passing around a cooling drum 38, the finished carpet product 11d is gathered into a finished carpet roll 40.

The process of the present invention will now be discussed in more detail. As illustrated in FIG. 2, the unfinished carpet starting material 11 is typically provided in the form of a roll 12. In order to maintain a continuous process, the free end of material 11 of a new roll 12 is attached to the trailing end of the material 11 from a previous roll 12. After attachment, the material 11 is gathered in a J-box or other material accumulator (not shown) to assure that the process may continue uninterrupted when the new roll of material 11 is attached.

Although the unfinished carpet starting material 11 may be used in an uncoated state, it is typically provided with a resin composition pre-coat layer adhered to the back of the material. As noted above, in a tufted carpet material, the pre-coat layer serves to lock the tufts to a woven primary backing. In a woven carpet material, the resin composition pre-coat layer may be formulated to penetrate the interstices of the woven material and encapsulate portions of the woven fibers as described in U.S. patent application Ser. No. 09/368,983 (the "'983 application"), which is incorporated by reference herein in its entirety. The pre-coat material may be ethylene vinyl acetate, PVC, styrene acrylic or other resin compositions such as those disclosed in the '983 Application.

In a preferred embodiment, the pre-coat layer is applied to the unfinished carpet material in a separate process line. It will be understood by those having ordinary skill in the art, that the application of the pre-coat could also be made a part of the process line of FIG. 2.

The carpet material 11 is continuously removed from the accumulator and fed to the vinyl application station 14. Heretofore, it has been necessary to apply at least the majority of the vinyl layers in an indirect manner. Specifically, in the old process, uncured virgin vinyl material is deposited on a continuous casting belt and formed into a substantially uniform layer by passing the belt beneath a straight-edged doctor blade. The doctor blade spreads the material and establishes the initial layer thickness. A sheet of scrim is then laid on top of the first vinyl layer. More vinyl is then deposited on top of the scrim and the material again passed beneath a doctor blade to spread the material into a second uniform layer. Importantly, the thicknesses of the two vinyl layers must be great enough that the scrim material is not torn or deformed when the material is passed under the doctor blade. After application of the second vinyl layer, the unfinished carpet material is laid on top of the vinyl/scrim layers and the combined materials are passed through a pair of rollers to press them together to form a single laminate. If desired, the pre-coated back of the unfinished carpet material may be coated with a third layer of vinyl prior to laying it on top of the vinyl/scrim layers. The vinyl-backed carpet is then passed through a curing oven to cure the vinyl in place. As the carpet exits the curing oven, it is cooled and separated from the belt. The vinyl layer releases from the belt and remains adhered to the back of the carpet. The carpet is then wound into a roll and transported to a finishing line where the vinyl is reheated for application of a backing layer.

The old method has several distinct disadvantages. First, it requires the use of a casting belt that must be coated with Teflon® or similar material to allow the release of the vinyl from the belt after it has been cast and cured. Second, the old method of vinyl application required that the thicknesses of the vinyl layer be greater than would otherwise be required. Smaller thicknesses cannot be produced because of the likelihood of damage to the scrim. In addition, when controlled by the use of a doctor blade, thickness uniformity decreases as thinner layers are produced.

The method according to the present invention eliminates the need for application of the vinyl to a belt and does not use a doctor blade for layer thickness control. In the present method, the vinyl layer is applied directly to the back of the carpet.

Figure 3:
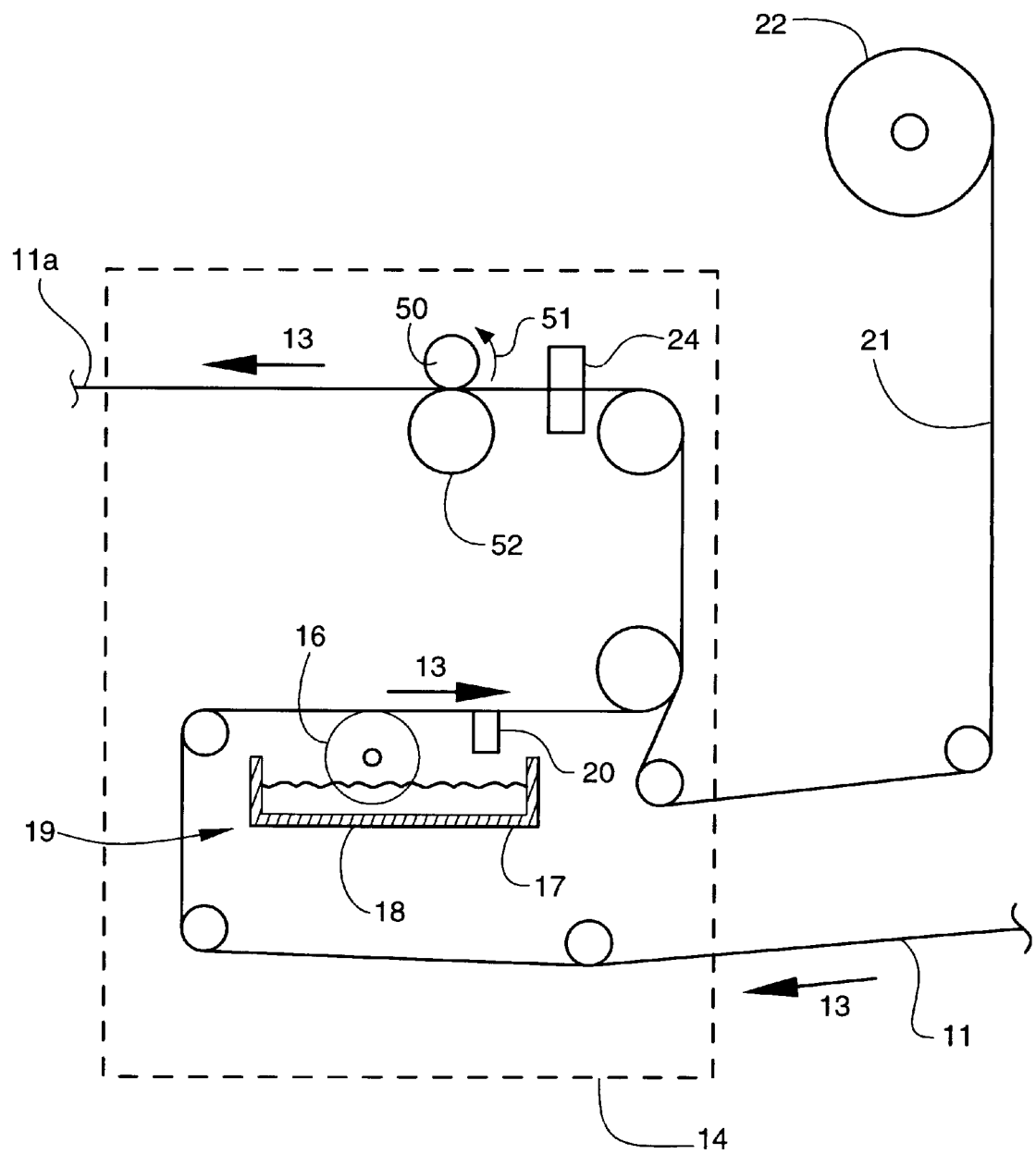
FIG. 3 is a schematic illustration of a vinyl layer application station that may be used in the process illustrated in FIG. 2.

Referring now to FIG. 3, the vinyl layer applicator station 14 is configured to apply a layer of vinyl on the back of the carpet with an encapsulated scrim sheet if desired. The direction of motion of the carpet layer 11 is illustrated by arrows 13. The vinyl is applied in two stages. A first vinyl portion is applied using a pan applicator 19 having an application roller 16. The application roller 16 is positioned so that as the roller 16 rotates, it collects the PVC plastisol material 17 from a pan 18. The carpet is fed into the pan applicator 19 so that the application roller 16 contacts the back of the carpet and deposits the vinyl material thereon. The amount of vinyl deposited is determined by the viscosity of the vinyl material, the speed of passage of the carpet material 11 and. the rotation speed of the application roller 16. The carpet is then passed over a press bar 20 that removes excess vinyl material and establishes a substantially uniform thickness. This initial application of vinyl may also be accomplished using other forms of applicators known in the art.

The carpet material 11 is then passed between a thickness control roller 50 and a conveying roller 52. The conveying roller 52 is in contact with the traffic face side of the carpet material 11 and rotates in the direction of motion of the carpet material 11 through the applicator 14. The thickness control roller 50 is used to remove excess vinyl material and precisely control the thickness of the vinyl layer. The thickness control roller 50 is precisely counter-balanced to "float" over the vinyl material to establish the desired layer thickness. It has been found that a high degree of control and consequent thickness uniformity can be achieved by rotating the control roller 50 at a predetermined rate in the direction 51 opposite to the direction 13 of movement of the carpet material 11. This was a surprising result and contrary to prior practice in similar uses of such rollers. The desirable rate of rotation of the control roller 50 may vary with the vinyl viscosity, the desired layer thickness and the speed at which the carpet layer is moved past the control roller 50.

It will be understood by those having ordinary skill in the art that the conveying roller 52 provides a base surface to assure that the control roller 50 provides a uniform desired thickness. Other methods of providing a smooth, flat base surface may be used without departing from the scope of the present invention.

If desired, additional vinyl may be applied at a secondary application station 24 just upstream of the control roller 50. The secondary application station 24 can include an additional pan applicator or standard direct applicator heads. The additional vinyl applicator 24 is particularly significant when it is desired to encapsulate a sheet of scrim 21 within the vinyl layer. As shown in FIG. 3, a sheet of scrim 21 is taken off a roll 22 and is contacted to the back of the carpet material 111 on which the first portion of vinyl has been deposited. The secondary applicator 24 then deposits a second portion of vinyl over the scrim 21. The carpet material is then passed between the thickness control roller 50 and the conveying roller 52.

As previously noted, the thickness of the final vinyl layer need be no greater than that which is required to encapsulate the scrim and to provide a substantially smooth, even surface for adhering a backing layer. The location of the scrim 21 within the overall vinyl layer is not significant as long as there is sufficient vinyl material to facilitate bonding of the backing layer to the carpet. Thus, the thickness of the vinyl layers 46, 48 on either side of the scrim 21 need not be precisely controlled. The use of the thickness control roller 50 allows the overall thickness of the combined vinyl and scrim laminate to be uniformly maintained while maintaining complete encapsulation of the scrim 21 and without damaging or distorting the scrim 21.

A typical overall weight of vinyl used in the above-described method is about 37 ounces per square yard of carpet. To achieve this overall weight, the first vinyl layer can be formed from about 5 to 20 ounces of vinyl per square yard of carpet material. The second vinyl layer would therefore vary from about 17 to 32 ounces per square yard. For comparison, the process constraints of the belt casting method force typically require the use of at least 45 ounces of vinyl per square yard. Accordingly, a typical carpet formed using the present method has 15–20% less virgin vinyl than typical carpets formed using previous methods.

Once the vinyl layers have been applied to the back of the carpet, the carpet is routed through a curing device 26 for curing the vinyl layer. The curing device 26 may be a heater, oven, or other curing means known to those skilled in the art. The curing device is preferably an oven set at a temperature sufficient to cure the vinyl layer for further processing of the carpet. The temperature required is a function of the vinyl layer thickness, the length of the oven and the rate at which the carpet is passed through the oven. Any combination that assures that the entire vinyl layer exceeds its cure temperature may be used. In one illustrative embodiment, the vinyl-backed carpet material 11a is placed on a belt and passed through an oven at a temperature of 400° F. in order to cure the vinyl material, which is a plastisol having a cure temperature in the range of about 340–360° F.

It will be understood that because the method of the present invention results in a thinner vinyl layer, there is a significant reduction in the energy required for curing the vinyl material. This provides added environmental and cost saving benefits.

When the carpet material 11a exits the curing device 26, a backing 27 is applied to the vinyl layer. This is preferably accomplished by heating the surface of the vinyl layer using a radiant infrared heater 29 and contacting the backing 27 to the vinyl layer. The surface of the backing 27 may also be heated prior to adhering the backing 27 to the vinyl layer. The carpet material 11a and the backing 27 are then pressed together by a pair of rollers 30 to form a backed carpet material 11b. The rollers 30 apply sufficient pressure to assure secure adhesion of the backing layer 27 to the preheated vinyl layer.

The backing 27 may be a padded (i.e., foamed) or a non-padded vinyl-based material of any construction suitable for use with rolled or tiled carpet products. One preferred backing layer is formed from recycled waste polymeric material as described in U.S. Pat. Nos. 5,728,741; 5,855,981; and 5, 914,343, each of which is incorporated by reference herein in its entirety. The backing 27 is typically manufactured in a separate line and supplied to the present carpet finishing line in the form of a roll 28.

Additional layers may then be applied to the backed carpet material 11b. If desired, an adhesive may be applied to the carpet backing layer using an adhesive applicator 32. The adhesive applicator 32 typically has a roller 34 that applies the adhesive to the carpet back. The adhesive may be a pressure sensitive or other adhesive suitable for carpet applications. The adhesive is preferably an oleophobic adhesive. As used herein the term "oleophobic" means the adhesive is resistant to the adverse effects of plasticizer migration. Suitable pressure sensitive oleophobic adhesives are described in U.S. Pat. No. 4,849,267, which is incorporated herein by reference in its entirety.

As an alternative to using a plasticizer-resistant adhesive, it may be desirable to apply a plasticizer-resistant barrier layer to the backed carpet 11b prior to the application of the adhesive layer. Such a barrier layer is desirable because it prevents migration of plasticizer out of the backing layer and also prevents moisture from penetrating into the backing layer from a substrate. Suitable barrier layer materials are described in detail in U.S. patent application Ser. No. 09/637,408.

Once the adhesive layer has been applied to the backed carpet 11b, the carpet 11b is passed through a dryer 35. In one embodiment, the dryer is an oven set at a temperature sufficient to drive water from the adhesive layer. Typically, the temperature of the oven is above about 200° F. Other embodiments may use infrared heaters or convection fans.

When the adhesive-backed carpet 11c exits the dryer 35, a releasable plastic sheet 36 is preferably applied over the adhesive layer. The finished carpet 11d is then passed over a cooling drum 38 and taken up into a roll 40.

The resulting carpet product 11d has a thin, uniform vinyl layer with a lower virgin vinyl material content than carpet products produced using prior methods. In addition, in the finishing method of the present invention, the entire finishing process is accomplished in a single manufacturing line.

It will be readily understood by those persons skilled in the art that the present invention is susceptible to broad utility and application. Many embodiments and adaptations of the present invention other than those herein described, as well as many variations, modifications and equivalent arrangement, will be apparent from or reasonably suggested by the present invention and the foregoing description without departing from the substance or scope of the present invention.

Accordingly, while the present invention has been described in detail in relation to its preferred embodiment, it is to be understood that this disclosure is only illustrative and exemplary of the present invention and is made merely for purposes of providing a full and enabling disclosure of the invention. The foregoing disclosure is not intended to be construed to limit the present invention or otherwise exclude any other embodiments, adaptations, variations, modifications or equivalent arrangements, the present invention being limited only by the claims and the equivalents thereof.

What is claimed is:

1. A method of assembling a floor covering comprising the steps of:
   providing a carpet layer having textile fibers defining an upper surface and having an opposing carpet layer back surface;
   forming a vinyl layer on the carpet layer back surface; and
   adhering a pre-formed polymeric backing layer to the vinyl layer, the pre-formed polymeric backing layer having a front backing surface for adhering to the vinyl layer and an opposing rear backing surface
   wherein the carpet layer is provided as a continuous sheet and the steps of forming a vinyl layer and adhering a pre-formed polymeric backing layer are performed on the carpet layer in a continuous manner in a single carpet finishing line, and wherein the step of forming a vinyl layer includes the following sequence of steps
   depositing a first portion of uncured vinyl material on the carpet layer back surface;
   spreading the first portion of uncured vinyl material across the carpet layer back surface to form the vinyl layer; and
   passing the carpet layer and the vinyl layer between a thickness control roller and a base surface in a predetermined direction, the control roller having an outer surface, a portion of which engages the vinyl layer, the control roller being rotated at a predetermined rate in a direction such that the portion of the control roller surface engaging the vinyl material moves in a direction opposite to the predetermined direction of motion of the carpet layer thereby establishing a substantially uniform vinyl layer thickness.

2. A method of assembling a floor covering according to claim 1 further comprising the step of applying an adhesive to the rear backing surface, wherein the step of applying an adhesive is performed in a continuous manner in the single carpet finishing line.

3. A method of assembling a floor covering according to claim 2 wherein the adhesive is an oleophobic pressure sensitive adhesive.

4. A method of assembling a floor covering according to claim 2 furtherer comprising the step of applying a release cover over the adhesive to prevent inadvertent adhesion of the adhesive prior to installation of the floor covering.

5. A method of assembling a floor covering according to claim 1 further comprising the steps of:
   applying a barrier layer to the rear backing surface, the barrier layer having an upper barrier surface adjacent the rear backing surface and a lower barrier surface; and
   applying an adhesive to the rear barrier surface;
   wherein the barrier layer is effective for substantially inhibiting migration of moisture from a substrate into the pre-formed polymeric backing layer and for substantially inhibiting migration of backing constituents from the pre-formed polymeric backing layer to the substrate.

6. A method of assembling a floor covering according to claim 5 further comprising the step of applying an adhesive to the rear barrier surface, wherein the barrier layer is effective for substantially inhibiting migration of backing constituents from the backing to the adhesive.

7. A method of assembling a floor covering according to claim 1 wherein the carpet layer includes a resin composition layer having a front resin surface adhered to at least a portion of the textile fibers and an opposing back resin surface.

8. A method of assembling a floor covering according to claim 7 wherein the carpet layer includes a primary backing to which the textile fibers are attached, the resin composition layer being formed so as to lock the textile fibers to the primary backing.

9. A method of assembling a floor covering according to claim 7 wherein the textile fibers are configured as interwoven warp and weft yarns thereby forming a woven carpet fabric having a traffic surface and an opposing rear fabric surface, the warp and weft yarns defining interstices therebetween and wherein the resin composition layer is formed on the rear fabric surface so that a portion of the resin composition layer occupies at least a portion of the interstices.

10. A method of assembling a floor covering according to claim 1 wherein the step of forming a vinyl layer further includes:
    applying a scrim sheet over the first portion of uncured vinyl material spread on the carpet layer back surface; and
    depositing a second portion of uncured vinyl material over the scrim sheet.

11. A method of assembling a floor covering according to claim 1 wherein the step of forming a vinyl layer further includes:
    heating the uncured vinyl material to a temperature above the cure temperature of the vinyl material to cure the vinyl layer and permanently adhere the vinyl layer to the carpet layer back surface.

12. A method of assembling a floor covering according to claim 1 wherein the vinyl layer is formed from a polyvinyl chloride plastisol material.

13. A method of assembling a floor covering comprising the steps of:
    providing a carpet layer having textile fibers defining an upper surface and having an opposing carpet layer back surface;
    depositing a first portion of uncured vinyl material on the carpet layer back surface;
    spreading the first portion of uncured vinyl material across the carpet layer back surface;

applying a scrim sheet over the first portion of uncured vinyl material;

depositing a second portion of uncured vinyl material over the scrim sheet;

passing the carpet layer with the first and second portions of uncured vinyl material and the scrim sheet applied thereto between a thickness control roller and a base surface in a predetermined direction, the control roller having an outer surface, a portion of which engages the second portion of uncured vinyl material, the control roller being rotated at a predetermined rate in a direction such that the portion of the control roller surface engaging the vinyl material moves in a direction opposite to the predetermined direction of motion of the carpet layer thereby establishing a vinyl and scrim laminate having a substantially uniform thickness;

heating the uncured vinyl material to a temperature above the cure temperature of the vinyl material to cure the vinyl and permanently adhere the vinyl and scrim laminate to the carpet layer back surface; and adhering a pre-formed polymeric backing layer to the vinyl layer, the pre-formed polymeric backing layer having a front backing surface for adhering to the vinyl layer and an opposing rear backing surface, wherein the carpet layer is provided as a continuous sheet and the steps of depositing a first portion, spreading the first portion, applying a scrim sheet, depositing a second portion, passing the carpet layer between a thickness control roller and a base surface, heating the uncured vinyl material, and adhering a pre-formed polymeric backing layer are performed on the carpet layer in a continuous manner in a single carpet finishing line.

14. A method of assembling a floor covering according to claim 13 further comprising the step of applying an adhesive to the rear backing surface, wherein the step of applying an adhesive is performed in a continuous manner in the single carpet finishing line.

15. A method of assembling a floor covering according to claim 14 wherein the adhesive is an oleophobic pressure sensitive adhesive.

16. A method of assembling a floor covering according to claim 14 further comprising the step of applying a release cover over the adhesive to prevent inadvertent adhesion of the adhesive prior to installation of the floor covering.

17. A method of assembling a floor covering according to claim 13 further comprising the step of:

applying a barrier layer to the rear backing surface, the barrier layer having an upper barrier surface adjacent the rear backing surface and a lower barrier surface; and applying an adhesive to the rear barrier surface;

wherein the barrier layer is effective for substantially inhibiting migration of moisture from a substrate into the pre-formed polymeric backing layer and for substantially inhibiting migration of backing constituents from the pre-formed polymeric backing layer to the substrate.

18. A method of assembling a floor covering according to claim 17 further comprising the step of applying an adhesive to the rear barrier surface, wherein the barrier layer is effective for substantially inhibiting migration of backing constituents from the backing to the adhesive.

19. A method of assembling a floor covering comprising the steps of:

providing a carpet layer having textile fibers defining an upper surface and having an opposing carpet layer back surface;

forming a vinyl layer on the carpet layer back surface; and adhering a backing layer to the vinyl layer, the backing layer comprising a pre-formed sheet formed at least in part from waste polymeric material and having a front backing surface for adhering to the vinyl layer and an opposing rear backing surface;

wherein the carpet layer is provided as a continuous sheet and the steps of forming a vinyl layer and adhering a backing layer are performed on the carpet layer in a continuous manner in a single carpet finishing line, and wherein the step of forming a vinyl layer includes the following sequence of steps depositing a first portion of uncured vinyl material on the carpet layer back surface;

spreading the first portion of uncured vinyl material across the carpet layer back surface to form the vinyl layer; and passing the carpet layer and the vinyl layer between a thickness control roller and a base surface in a predetermined direction, the control roller having an outer surface, a portion of which engages the vinyl layer, the control roller being rotated at a predetermined rate in a direction such that the portion of the control roller surface engaging the vinyl material moves in a direction opposite to the predetermined direction of motion of the carpet layer thereby establishing a substantially uniform vinyl layer thickness.

20. A method of assembling a floor covering according to claim 19 further comprising the steps of:

applying a barrier layer to the rear backing surface, the barrier layer having an upper barrier surface adjacent the rear backing surface and a lower barrier surface; and applying an adhesive to the rear barrier surface;

wherein the barrier layer is effective for substantially inhibiting migration of moisture from a substrate into the backing layer and for substantially inhibiting migration of backing constituents from the backing layer to the substrate.

21. A method of assembling a floor covering according to claim 19 wherein the step of forming a vinyl layer further includes:

heating the uncured vinyl material to a temperature above the cure temperature of the vinyl material to cure the vinyl layer and permanently adhere the vinyl layer to the carpet layer back surface.

22. A method of assembling a floor covering according to claim 19 wherein the step of forming a vinyl layer further includes prior to the step of passing the carpet layer and the vinyl layer between a thickness control roller and a base surface:

applying a scrim sheet over the first portion of uncured vinyl material; and depositing a second portion of uncured vinyl material over the scrim sheet.

23. A method of assembling a floor covering according to claim 22 wherein the step of forming a vinyl layer further includes:

heating the first and second portions of uncured vinyl material to a temperature above the cure temperature of the vinyl material to cure the vinyl layer and permanently adhere the vinyl layer to the carpet layer back surface.

* * * * *